Jan. 15, 1957  A. U. BRYANT  2,777,937
WELDING APPARATUS
Filed Nov. 2, 1954  3 Sheets-Sheet 1
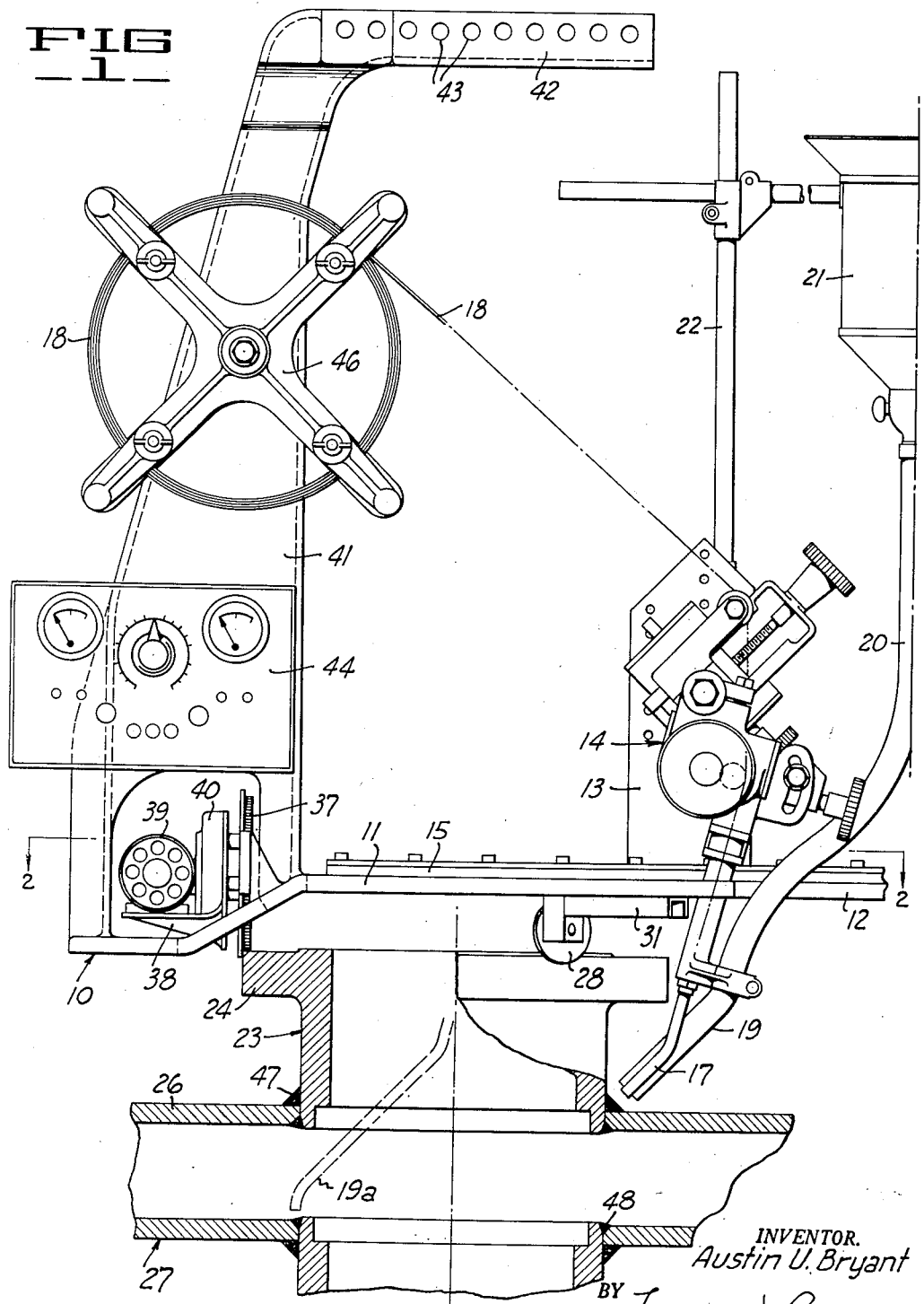
INVENTOR.
Austin U. Bryant
BY
ATTORNEYS

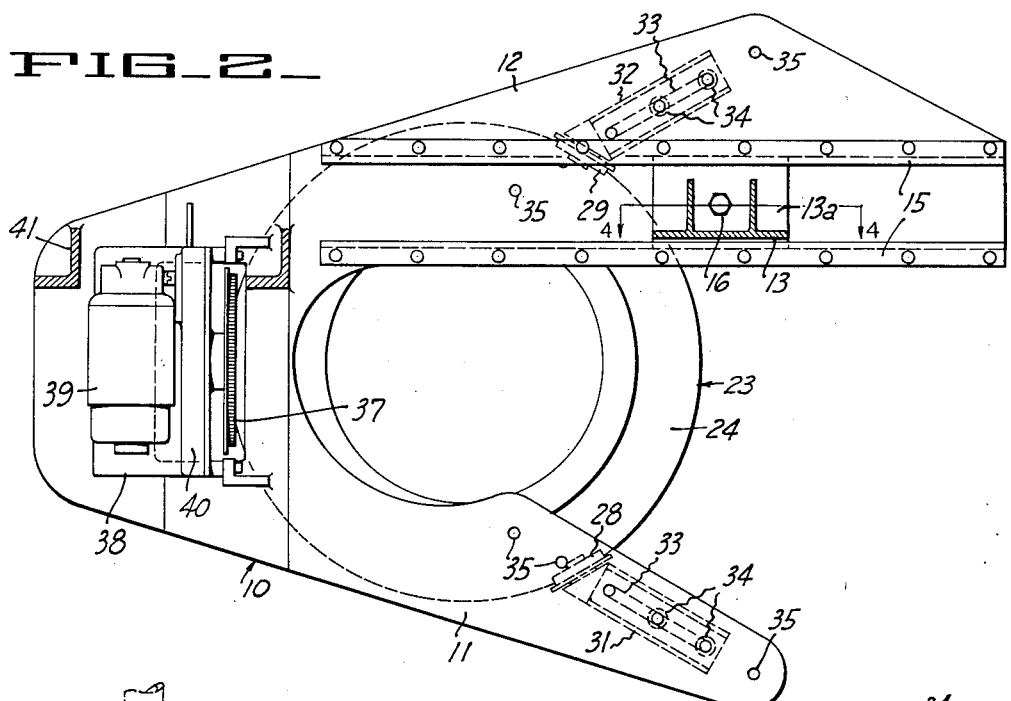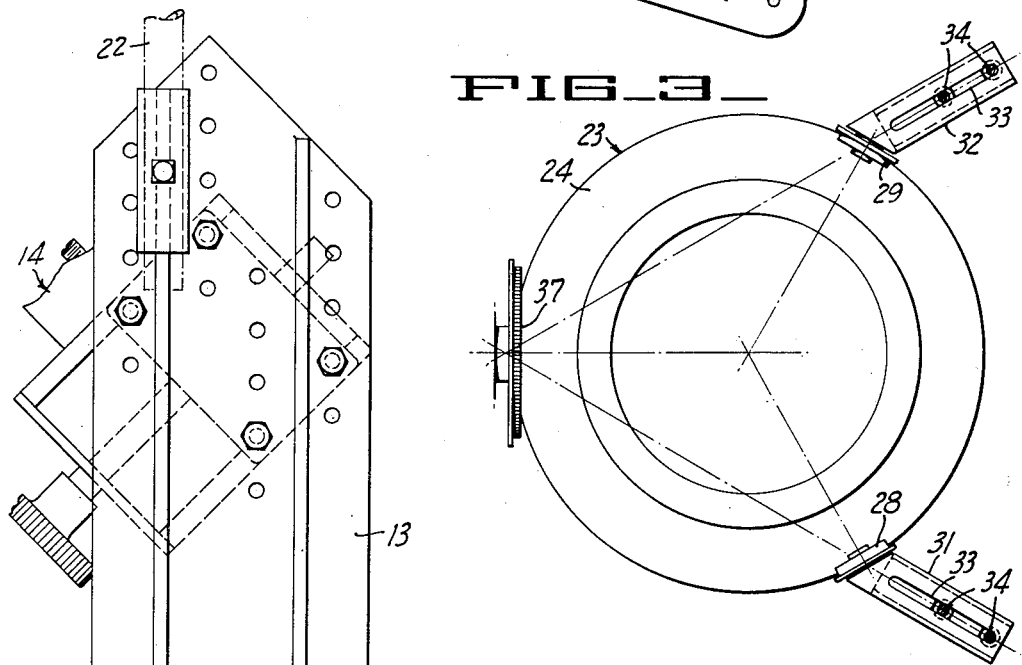

Jan. 15, 1957   A. U. BRYANT   2,777,937
WELDING APPARATUS
Filed Nov. 2, 1954   3 Sheets-Sheet 3
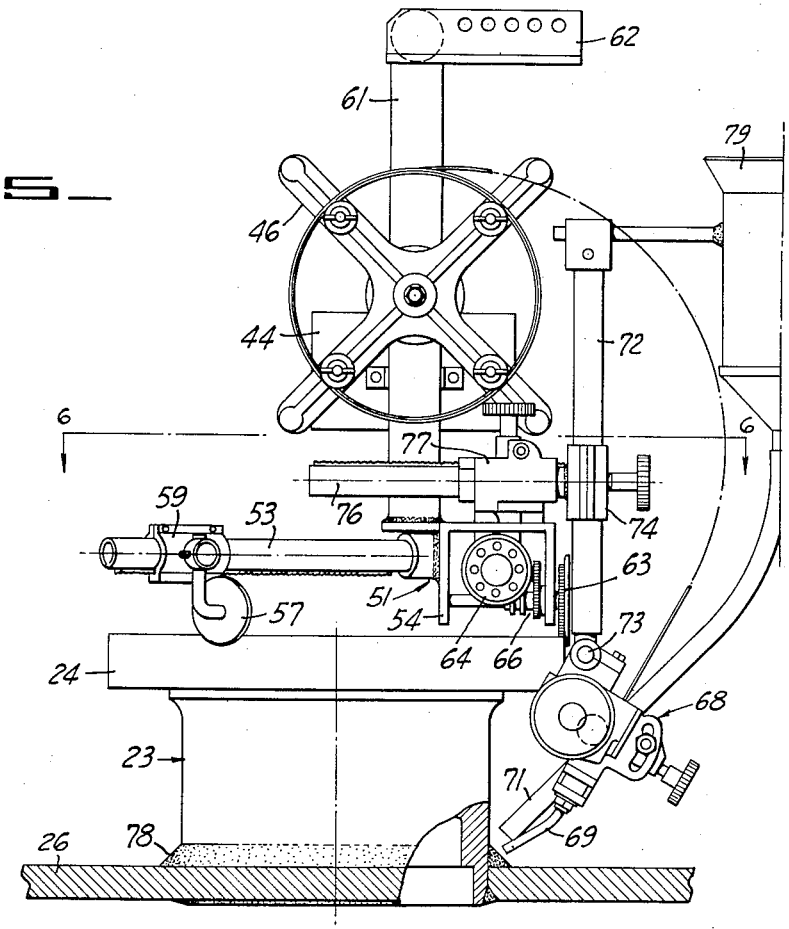
FIG_5_
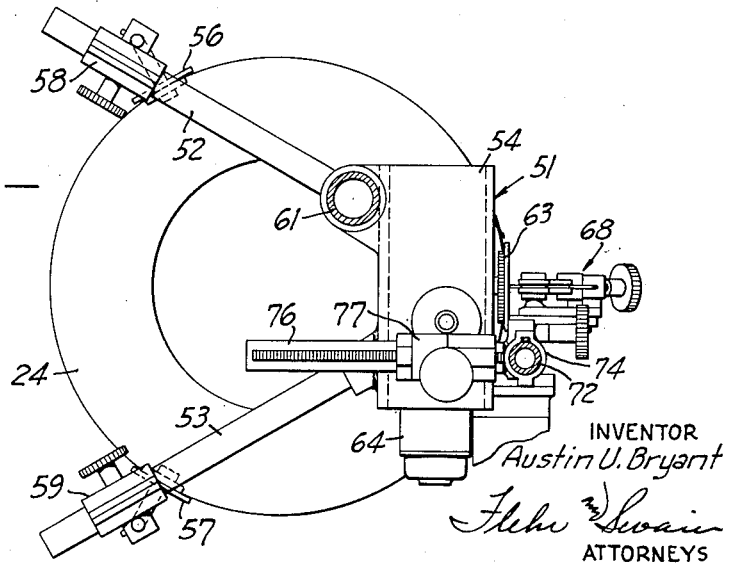
FIG_6_
INVENTOR
Austin U. Bryant
ATTORNEYS / 2,777,937
Patented Jan. 15, 1957

2,777,937
WELDING APPARATUS

Austin U. Bryant, Berkeley, Calif., assignor to Grove Valve & Regulator Company, Emeryville, Calif., a corporation of California Application November 2, 1954, Serial No. 466,325

5 Claims. (Cl. 219—125)

The invention relates generally to electrical welding apparatus suitable for use in metal fabrication operations where a circular weld or like continuous weld is required.

In general, it is an object of the present invention to provide a machine of the above character which can be readily applied to the work undergoing fabrication.

Another object of the invention is to provide apparatus of the above character which can be readily adjusted and adapted for different diameters of circular weldings.

Another object of the invention is to provide apparatus of the above character which is suitable for both interior and exterior welding operations.

Another object of the invention is to provide welding apparatus in which the operating parts are carried by a novel frame and which is arranged to provide for circular tracking during a welding operation.

Additional objects and features of the invention will appear from the following description in which the preferred embodiment has been described in detail in conjunction with the accompanying drawing.

Referring to the drawing:

Figure 1 is a side elevational view illustrating a welding machine in accordance with the present invention.

Figure 2 is a cross-sectional view taken along the line 2—2 of Figure 1.

Figure 3 is a schematic view with parts removed, and illustrating the manner in which the apparatus is tracked for circular rotation.

Figure 4 is a cross-sectional view taken along the line 4—4 of Figure 2.

Figure 5 is a side-elevational viewed partly in section, illustrating a modified form of apparatus.

Figure 6 is a cross-sectional view taken along the line 6—6 of Figure 5.

The apparatus illustrated in Figures 1 and 2 consists of a frame 10 which is formed to provide the two open branches 11 and 12. As viewed in plan (Figure 2) the frame forms generally an open V. All of the parts ordinarily used in welding operations are mounted upon this frame. Thus a mounting bracket 13 is attached to the branch 12 and serves to support a conventional welding head 14. The base 13a of this bracket may be adjustably positioned in the guideways 15, and clamped in a desired position by bolt 16. The welding head includes the nozzle 17 through which the welding wire 18 is fed. Assuming that the welding is in accordance with the submerged arc method, a flux discharge nozzle 19 can be supported immediately in advance of the welding wire nozzle 17. Hose 20 connects nozzle 19 with the flux hopper 21, and this hopper can be supported by suitable means such as the adjustable standard 22 carried by bracket 14.

It is assumed that the apparatus is to be used in conjunction with a work piece 23 in the form of a hub having a circular flange 24. In the assumed fabricating operation the hub is to be welded to the wall 26, which may be one side wall of a valve body 27.

The frame 10 carries tracking means for engaging the flange 24. Thus flanged wheels 28 and 29 are carried by the mounts 31 and 32, and these mounts in turn are adjustably attached to the branches 11 and 12. With the construction illustrated each mount is provided with a slot 33 engaged by two clamping screws 34. The clamping screws may be engaged in any one of a plurality of threaded openings 35. The openings 35, for the two branches 11 and 12, are on center lines extending at an angle to each other to facilitate the desired adjustments. In a typical instance this angle may be of the order of 60 degrees.

In addition to the flanged tracking wheels 28 and 29, I provide a flanged tracking wheel 37 which is rotatably carried by the mounting 38. An electric driving motor 39 is also carried by the mounting, and serves to drive the wheel 37 at a desired rate through suitable speed reduction gearing 40.

The mounting 38 is carried by that portion of the frame which forms the junction between the branches 11 and 12.

A rigid structural post 41 is also carried by the frame and mounts a lateral arm 42 at its upper end. This arm is provided with a plurality of openings 43 by means of which it can be engaged by the lift hook of a crane or hoist, to facilitate lifting and handling operations. The post 41 can also be used to mount the control panel 44 of the welding equipment, and the supply reel 46 for the welding wire.

Operation of the apparatus shown in Figures 1 and 2 is as follows: The mounts 31 and 32 for the wheels 28 and 29 are positioned on the branches 11 and 12 in such a manner that the wheels 28 and 29 together with the flanged driving wheel 37, track about the circular flange 24 of the hub 23. Assuming that one desires to make a circular weld 47 between the hub and the wall 26, the nozzles 17 and 19 are adjusted to the positions shown in Figure 1, the welding head is started in operation, and motor 39 is energized whereby the entire apparatus is rotated about the axis of the hub at a constant rate. Upon the completion of one welding operation it is a simple matter to lift the entire apparatus and lower it into operating position with another like hub, for a similar operation. When it is desired to make an interior weld, such as the circular weld 48, the mounting bracket 13 is shifted together with the welding head 14, to bring a welding wire nozzle 19a into the position illustrated in dotted lines in Figure 1. The machine is then operated in the same manner as explained above.

When it is desired to adapt the machine for welding on a different diameter, the mountings 31 and 32 are adjusted for proper tracking, and the bracket 13, the welding head and the nozzles are adjusted for the new diameter.

The modification illustrated in Figures 5 and 6 employs a frame 51 which is likewise in the form of an open V. However, in this instance the branches 52 and 53 are made of rigid tubing, and are attached to the junction casting 54. Tracking rollers 56 and 57 are rotatably carried by the mountings 58 and 59 and these mountings are in the forms of clamps adjustably secured to the branches 52 and 53. The casting 54 mounts the vertical post 61, the upper end of which carries the laterally extending pickup arm 62. A flanged driving wheel 63 is driven by the electric motor 64, through the speed reduction gearing 66.

Suitable means is provided for adjustably carrying the welding head 68, together with the associated wire and flux nozzle 69 and 71. The particular mounting means illustrated employs a vertical post 72 having a hinge connection 73 with the welding head. This post is adjustably engaged by the clamp 74, the clamp in turn being secured to one end of the horizontally adjustable rod 76. A mounting 77 serves to carry the rod 76 and to permit its adjustment in a horizontal direction. With this type of support for the welding head it is a simple matter to raise or lower the head, adjust it toward or away from the frame 51, or tilt the welding head to any desired angle. In Figure 5 this apparatus is shown adjusted for making the circular exterior weld 78. The post 72 can also be used to support the flux hopper 79.

It will be evident from the foregoing that I have provided a welding apparatus having a high degree of adaptability and flexibility for various types and sizes of circular welding operations. The apparatus can be quickly shifted from one job to the next, and it can be readily adjusted to a wide variety of diameters. Also it can be readily adjusted for exterior or interior welding operations, or if desired, two pieces of apparatus of similar construction but with different adjustments, can be used for exterior and interior welding.

I claim:

1. In welding apparatus for circular welding operations on hubs having a circular end, a frame, means including tracking wheels engaging the circular end of the hub for supporting the frame and for rotation of the frame about the axis of the hub, means for driving the tracking means at a constant rate, and a welding head carried by the frame and disposed for a circular welding operation between the hub and an adjacent work piece.

2. In welding apparatus for circular welding on hubs having a circular head, a frame having side branches and in the form of open V, means carried by the frame including tracking wheels engaging the circular end of the hub whereby the frame is supported and caused to rotate about the axis of the hub, means for driving one of the tracking wheels at a constant rate, and a welding head carried by the frame and disposed to carry out a circular welding operation between the hub and an adjacent work piece.

3. Apparatus for circular welding on hubs having a circular end, a frame consisting of side branches and a junction portion, the frame being in the form of an open V, means for tracking the frame on a circular end of the hub for rotation about the axis of the hub, said means including tracking wheels carried by the branches and by the junction portion of the frame, means for driving one of said wheels for turning the frame about the axis of the hub, and a welding head carried by the frame, said welding head being disposed to carry out a circular welding operation between the hub and an adjacent work piece.

4. Apparatus as in claim 3 together with a post attached to the junction portion of the frame and a lift arm attached to the upper end of the post.

5. Apparatus as in claim 3 in which the tracking wheels carried by the branches are adjustable along the length thereof.

References Cited in the file of this patent

UNITED STATES PATENTS

| | | |
|---|---|---|
| 1,508,713 | Noble | Sept. 16, 1924 |
| 1,809,653 | Wagner et al. | June 9, 1931 |
| 1,949,251 | Gilbert | Feb. 27, 1934 |